United States Patent
Muthuswamy et al.

[11] Patent Number: 6,060,188
[45] Date of Patent: May 9, 2000

[54] HIGH PRESSURE COAXIAL FUEL CELL

[75] Inventors: Sivakumar Muthuswamy; Steven D. Pratt, both of Plantation; Ronald J. Kelley, Coral Springs; Rudy Yorio, Pompano Beach, all of Fla.

[73] Assignee: Motorola, Inc., Schaumburg, Ill.

[21] Appl. No.: 09/055,415

[22] Filed: Apr. 6, 1998

[51] Int. Cl.[7] .............................. H01M 8/10; H01M 2/00; H01M 4/00
[52] U.S. Cl. ................ 429/31; 429/33; 429/34; 429/94
[58] Field of Search ................... 429/31, 33, 34, 429/94

[56] References Cited

U.S. PATENT DOCUMENTS

| | | | |
|---|---|---|---|
| 4,341,847 | 7/1982 | Sammells | 429/27 |
| 4,420,544 | 12/1983 | Lawson et al. | 429/13 |
| 5,458,989 | 10/1995 | Dodge | 429/31 |

*Primary Examiner*—Edna Wong
*Attorney, Agent, or Firm*—Dale W. Dorinski

[57] ABSTRACT

A fuel cell (20) can be constructed to be generally formed in the shape of a solid cylinder. The fuel cell has a porous central core (22) of reticulated vitreous aluminum that is formed in the shape of a solid cylinder. The porous central core serves to distribute oxidant throughout the fuel cell. A cathode (23) is situated coaxially around the porous central core, and has a catalytic layer (24) on the outer side. A solid polymer electrolyte (25) is situated coaxially around the cathode and in intimate contact with the catalytic layer. An anode (27) is situated coaxially around the electrolyte, and a second layer of catalytic material (26) is situated between the electrolyte and the anode. A fuel chamber (28) is situated coaxially around and in intimate contact with the anode and arranged to distribute fuel throughout the fuel cell.

23 Claims, 6 Drawing Sheets

HIGH PRESSURE COAXIAL FUEL CELL

CROSS REFERENCE TO RELATED APPLICATIONS

This application is related to U.S. application Ser. No. 08/908,891, filed Aug. 8, 1997, now abandoned, by Pratt, et al., entitled "Tubular Fuel Cell," and assigned to Motorola, Inc.

FIELD OF THE INVENTION

This invention relates generally to fuel cells.

BACKGROUND OF THE INVENTION

Fuel cells are electrochemical cells in which a free energy change resulting from a fuel oxidation reaction is converted into electrical energy. As shown in FIG. 1, a typical fuel cell 10 consists of a fuel electrode (anode) 12 and an oxidant electrode (cathode) 14, separated by an ion-conducting electrolyte 16. The electrodes are connected electrically to a load (such as an electronic circuit) 18 by an external circuit conductor. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. In theory, any substance capable of chemical oxidation that can be supplied continuously (as a gas or fluid) can be oxidized galvanically as the fuel 13 at the anode 12 of a fuel cell. Similarly, the oxidant 15 can be any material that can be reduced at a sufficient rate. For specialized systems, both reactants might be liquids, such as hydrazine for the fuel and hydrogen peroxide or nitric acid for the oxidant. Gaseous hydrogen has become the fuel of choice for most applications, because of its high reactivity in the presence of suitable catalysts and because of its high energy density when stored as a cryogenic liquid, such as for use in space. Similarly, at the fuel cell cathode 14 the most common oxidant is gaseous oxygen, which is readily and economically available from the air for fuel cells used in terrestrial applications. When gaseous hydrogen and oxygen are used as fuel and oxidant, the electrodes are porous to permit the gas-electrolyte junction to be as great as possible. The electrodes must be electronic conductors, and possess the appropriate reactivity to give significant reaction rates. The most common fuel cells are of the hydrogen-oxygen variety that employ an acid electrolyte. At the anode 12, incoming hydrogen gas 13 ionizes to produce hydrogen ions and electrons. Since the electrolyte is a non-electronic conductor, the electrons flow away from the anode via the metallic external circuit. At the cathode 14, oxygen gas 15 reacts with the hydrogen ions migrating through the electrolyte 16 and the incoming electrons from the external circuit to produce water as a byproduct. Depending on the operating temperature of the cell, the byproduct water may enter the electrolyte, thereby diluting it and increasing its volume, or be extracted through the cathode as vapor. The overall reaction that takes place in the fuel cell is the sum of the anode and cathode reactions; in the present case, the combination of hydrogen with oxygen to produce water, with part of the free energy of reaction released directly as electrical energy. The difference between this available free energy and the heat of reaction is produced as heat at the temperature of the fuel cell. It can be seen that as long as hydrogen and oxygen are fed to the fuel cell, the flow of electric current will be sustained by electronic flow in the external circuit and ionic flow in the electrolyte.

In practice, a number of fuel cells are normally stacked or 'ganged' together to form a fuel cell assembly. The anode/electrolyte/cathode sub-unit is typically referred to as an 'electrode assembly' (EA). The cathode of the first EA is typically disposed next to the anode of a subsequent EA, but separated by a bipolar plate. The bipolar plate is typically carbon, chosen for its unique combination of properties; chemical inertness, electrical conductivity, rigidity and the ability to be machined. A network of channels are typically formed in the bipolar plate by mechanical machining to distribute gaseous or liquid fuel and oxidant to the anode and cathode respectively. The bipolar plate provides electrical connection from one EA to the next, and also serves to isolate the anode fuel from the cathode oxidant in adjacent EA's. In order to further contain the fuel and keep it separate from the oxidant, a sealing means, such as an o-ring or other exterior gasket, must be provided. Other traditional types of fuel cells use extremely complex flat stack arrangements consisting of a membrane, gaskets, channels, electrodes and current collectors that are difficult and expensive to fabricate and assemble, and are highly subject to catastrophic failure of the entire system if a leak develops. As can be easily appreciated, the cost of fabricating and assembling fuel cells is significant, due to the materials and labor involved. Typically, 85% of a fuel cell's cost is attributable to manufacturing costs. Thus, the complexity of prior art fuel cell structures is one of the factors preventing widespread acceptance of fuel cell technology. An improved style of fuel cell that is less complex and less prone to failure would be a significant addition to the field.

BRIEF DESCRIPTION OF THE DRAWINGS

Drawing FIGS. 2–6 are intentionally not drawn to scale in order to better illustrate various details of the invention.

DETAILED DESCRIPTION OF THE PREFERRED EMBODIMENT

A fuel cell can be constructed to be generally formed in the shape of a solid cylinder. The fuel cell has a porous central core of reticulated vitreous aluminum or carbon that is formed in the shape of a solid cylinder. The porous central core serves to distribute fuel or oxidant throughout the fuel cell. An inner electrode (cathode or anode) is situated coaxially around the porous central core, and has a catalytic layer on the outer side. A solid polymer electrolyte is situated coaxially around the electrode and in intimate contact with the catalytic layer. Another electrode is situated coaxially around the electrolyte, and a second layer of catalytic material is situated between the electrolyte and this electrode. A fuel or oxidant chamber is situated coaxially around and in intimate contact with the second electrode and arranged to distribute the fuel or oxidant throughout the fuel cell. In the situation where fuel is distributed through the porous central core and oxidant is passed through the outer chamber, the inner electrode is the anode and the outer electrode is the cathode. When the fuel and oxidant chambers are reversed, the inner electrode is the cathode and the outermost electrode is the anode.

Figure 1:
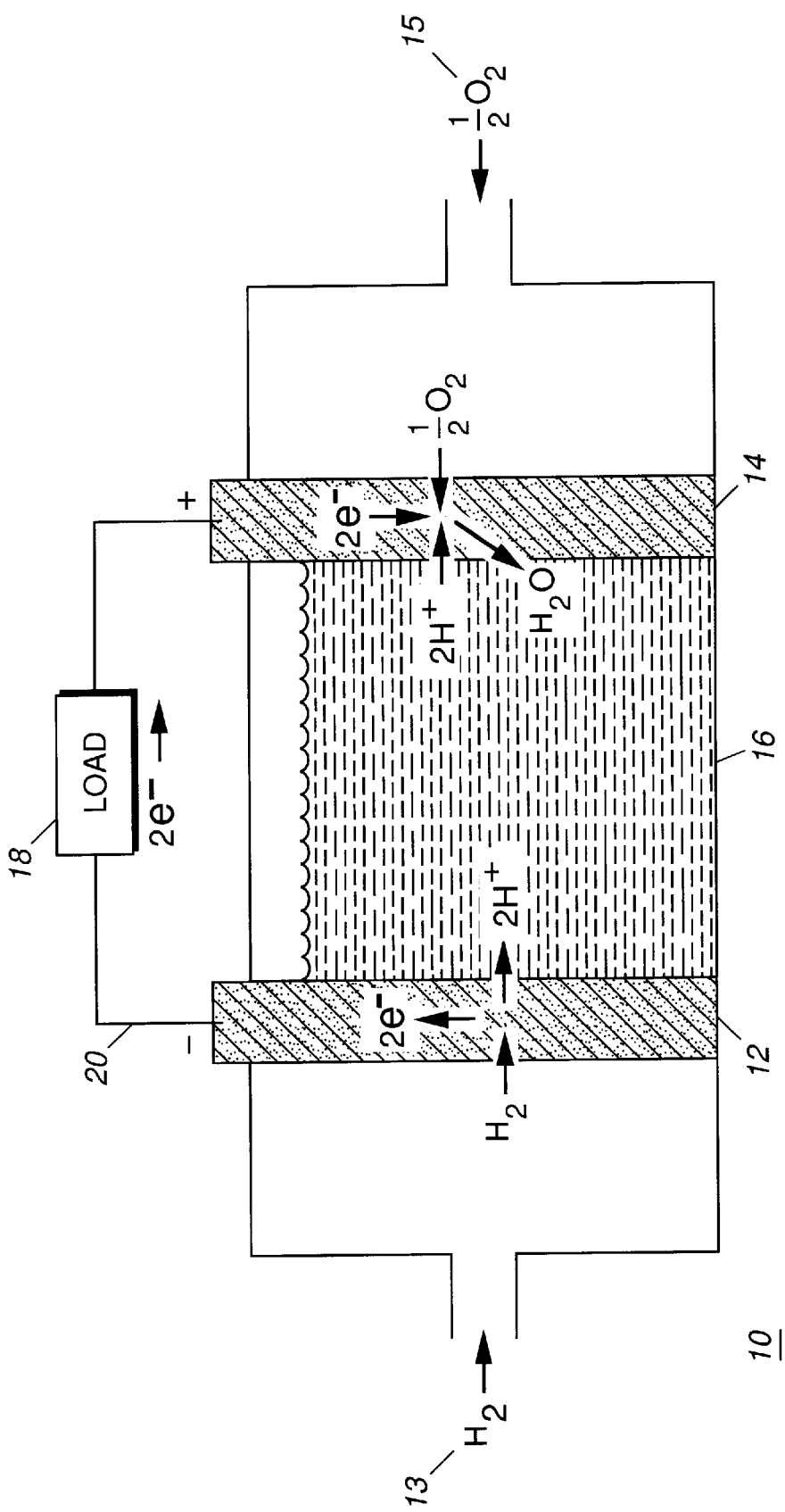
FIG. 1 is schematic representation of a typical fuel cell as practiced in the prior art.
Figure 2:
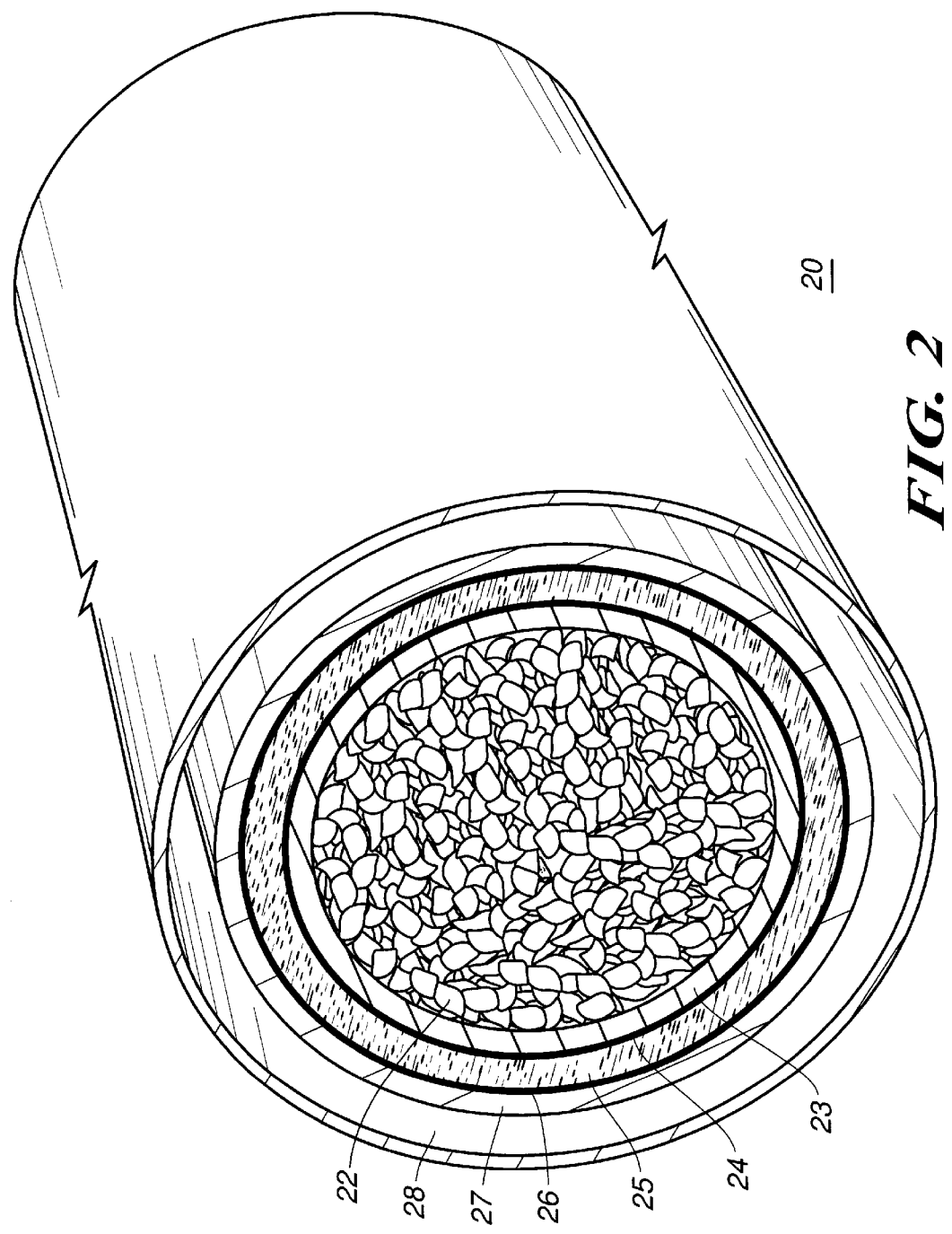
FIG. 2 is a cross-sectional view of one embodiment of a high pressure fuel cell in accordance with the invention.

Referring now to FIG. 2, one way of describing a cylindrical fuel cell 20 is to start with a porous central core 22 that has a certain geometrical cross-section. The cross-section can be circular, hexagonal, square or any other desired geometric shape, although we prefer circular. As used in the context of this disclosure, the terms 'cylindrical' or 'cylinder' means a structure having a generally solid cylindrical shape with a long axis down the center of the cylinder, the solid cylinder having any of a number of cross sections such as circular, elliptical, square, pentagonal, hexagonal, etc. The porous central core could also have a dynamically varying cross-sectional shape, resulting in a fuel cell of variable cross section. This may be desired for creating fuel cells that fit easily into a contoured package, for example a battery housing for a two-way radio. One preferred material for the porous central core is a reticulated vitreous aluminum matrix known as DUOCEL®, made by ERG of Oakland, Calif. DUOCEL® is a rigid foam material made from 6101-O aluminum alloy, and has densities from 6–8%, and is available in 10, 20 and 40 pores per inch (PPI). Other reticulated materials, such as carbon and other metals, are also available. One primary advantage of this material is that it is very rigid, thus providing a solid base to fabricate the fuel cell around. The porous central core also serves as the distributing medium for the oxidant. The oxidant, either gas or liquid, is introduced into the core, preferably at one end, and is distributed linearly throughout the fuel call by means of the myriad interconnected pores of the DUOCEL®.

Next, a first electrode material, or cathode, 23 overlies the porous central core 22. By coating the electrode onto the electrically conductive foamed metal, the central core 22 also functions as a current collector, thus eliminating the need for a separate current collector, as has been practiced in the prior art. The electrode material is preferably a woven cloth 23 or paper composed of fibers having a high electrical conductivity. On the exterior surface of the cathode is disposed a suitable catalyst 24, such as platinum or alloys thereof, and any of the Group VIII metals or alloys containing Group VIII metals. Characteristics required for the cathode 23 include high electrical conductivity and gas permeability.

A solid polymer electrolyte material 25 is the next layer to be applied. The solid polymer electrolyte is composed of an electrically insulating material that is gas-impermeable and ion-permeable. Suitable solid polymer electrolyte materials include films of perfluorinated sulfonic acids derived from fluorinated styrenes, quaternary amine polystyrene, NAFION® (trademark of E.I. DuPont de Nemours, Inc.), polybenzimidazole (PBI), or other ionomeric polymers. NAFION® is a sulfonated polyfluoroaliphatic hydrogel capable of absorbing water and of withstanding the chemical environment of the cell. NAFION® has superior mechanical strength, predictable dimensional changes, high electrical conductivity and the ability to transport the desired ions while rejecting the undesired ions and molecules.

Next, we find another layer of a catalyst material 26. The catalysts for the anode may be chosen from the same group used for the previous catalyst. Overlying this is the anode 27, similar in construction to the previous electrode, but with suitable differences well known to those skilled in the art to make it an efficient anode. To review, the electrolyte is sandwiched between the cathode and the anode, with a catalyst layer on the sides of the electrodes that face the electrolyte. This cathode-electrolyte-anode system is coaxially surrounding the porous central core so that the oxidant can be evenly distributed to the cathode. A current collector (not shown in the drawing) is formed on the outside of the anode, and is formed by any number of conventional techniques, for example, using a wire mesh. The current collector must be porous enough to allow the fuel to pass through it to the anode.

Finally, a fuel chamber 28 is coaxially formed around the outside of the anode along the length of the cylinder so that the fuel can be evenly distributed to all surfaces of the anode 27. This construction provides a fuel cell that is strong and rigid and capable of being operated at high pressures. The oxidant and fuel can now be introduced to the fuel cell at high pressures, enabling the fuel cell to operate at much higher efficiency than previously possible. Prior art systems have all been designed to operate at or near ambient pressures, because they have been made of fragile materials and complex mechanical construction. The stiff, rigid central core of our novel fuel cell allows it to be run at substantially higher pressures (in excess of 2 atmospheres, and up to 10 atmospheres), thus increasing the reaction rate and output. The high mechanical strength of our fuel cell also allows liquid fuels and oxidants to be used, as hydraulic pressure will not collapse the system. Our preferred embodiment is to use pressurized air as the oxidant and pressurized hydrogen as the fuel, but other systems such as oxygen gas and liquid methanol can also be used. When an oxidizing gas is flowed through the porous central core under pressure and a fuel gas such as hydrogen is flowed through the fuel chamber under pressure, an electrical potential is developed and power can be extracted from terminals (not shown) that are appropriately connected to the cell. Typically, the oxidant and fuel are introduced into one end of the cylinder and recovered or vented at the other end. However, additional inlets and outlets can be provided along the length of the cylinder in appropriate manifolding if desired, and still be considered to fall with the scope and spirit of our invention. Unreacted fuel can be recovered from an outlet at the other end of the cell and recycled to the inlet.

Figure 3:
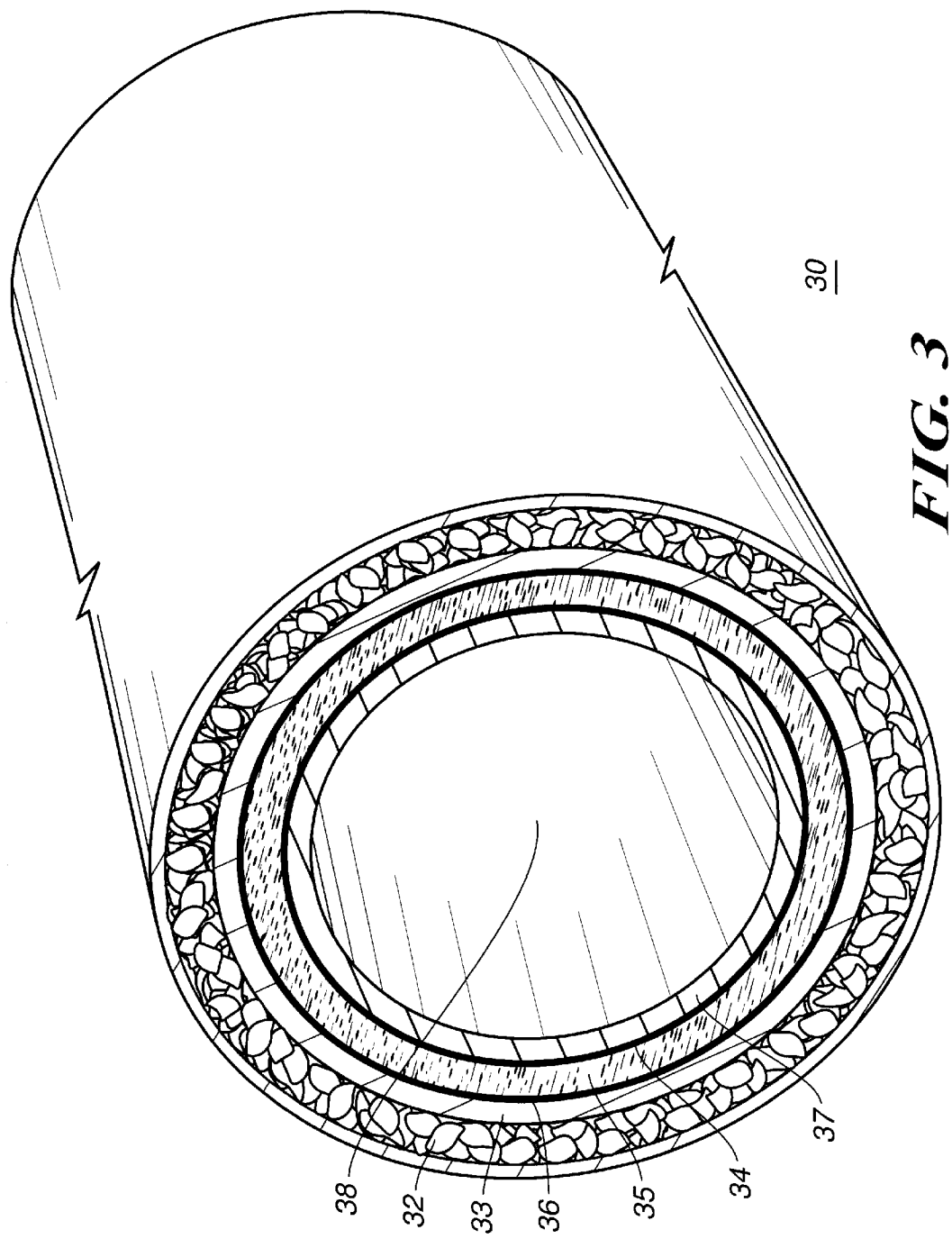
FIGS. 3–6 are cross-sectional views of alternate embodiments of a high pressure fuel cell in accordance with the invention.

In an alternate embodiment of the invention shown in FIG. 3, the reticulated vitreous metal 32 is used on the exterior of the system to transport the air throughout the cell 30. Note that in the previous example, oxidant was transported down the center of the fuel cell through the porous metal, and in this alternate embodiment, fuel is transported down the center in a hollow chamber 38. This embodiment is essentially the inverse of that shown in FIG. 2. An anode 37 made in the same manner as previously described is formed about the hollow chamber 38 that serves as the fuel distribution means/reservoir. Overlying the anode is a catalytic layer 34, and overlying this is the solid polymer electrolyte 35. Overlying the solid polymer electrolyte is another catalytic layer 36, and over that is a cathode 33, The anode, cathode, electrolyte and catalytic layers are concentric and coaxial to the hollow central core. Surrounding this coaxial laminated structure is the reticulated vitreous metal 32 foam that provides a rigidizing function to the entire structure, and also transports the oxidant throughout the fuel cell. By introducing oxidant and fuel at high pressures to this structure, a high output fuel cell is provided.

Figure 4:
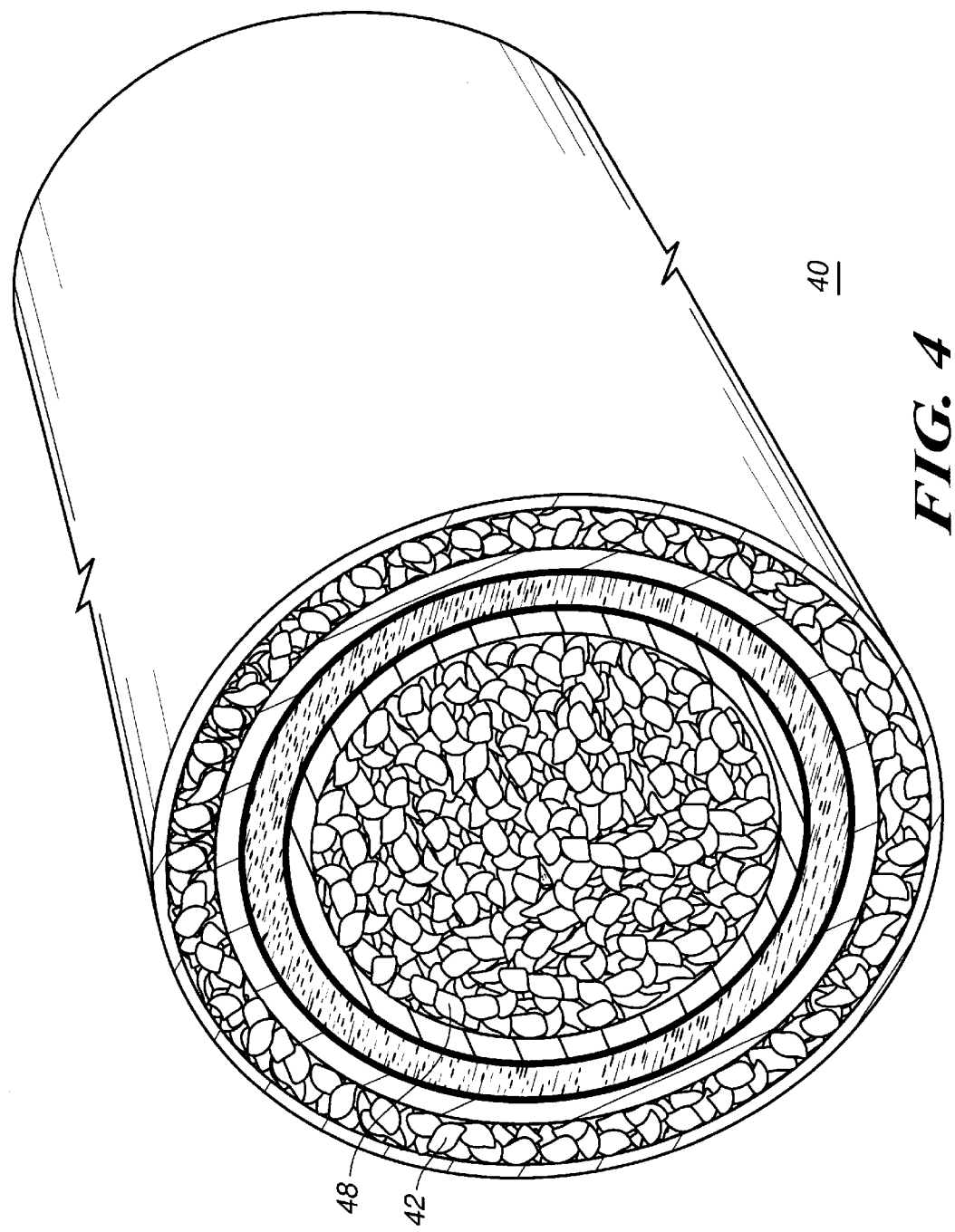

Referring now to FIG. 4, one obvious variant of the two embodiments described in FIGS. 2 and 3 is to use the reticulated vitreous metal as both the inner core 48 and the outer chamber 42. This produces an extremely rigid structure, and allows the use of even higher fuel and oxidant pressures. The foamed metal acts as current collectors for both the anode and the cathode. This configuration allows the fuel to be transferred either down the central core or down the outer chamber. In any event, the electrode closest to the fuel chamber is the anode, and the electrode closest to the oxidant chamber is the cathode.

Figure 5:
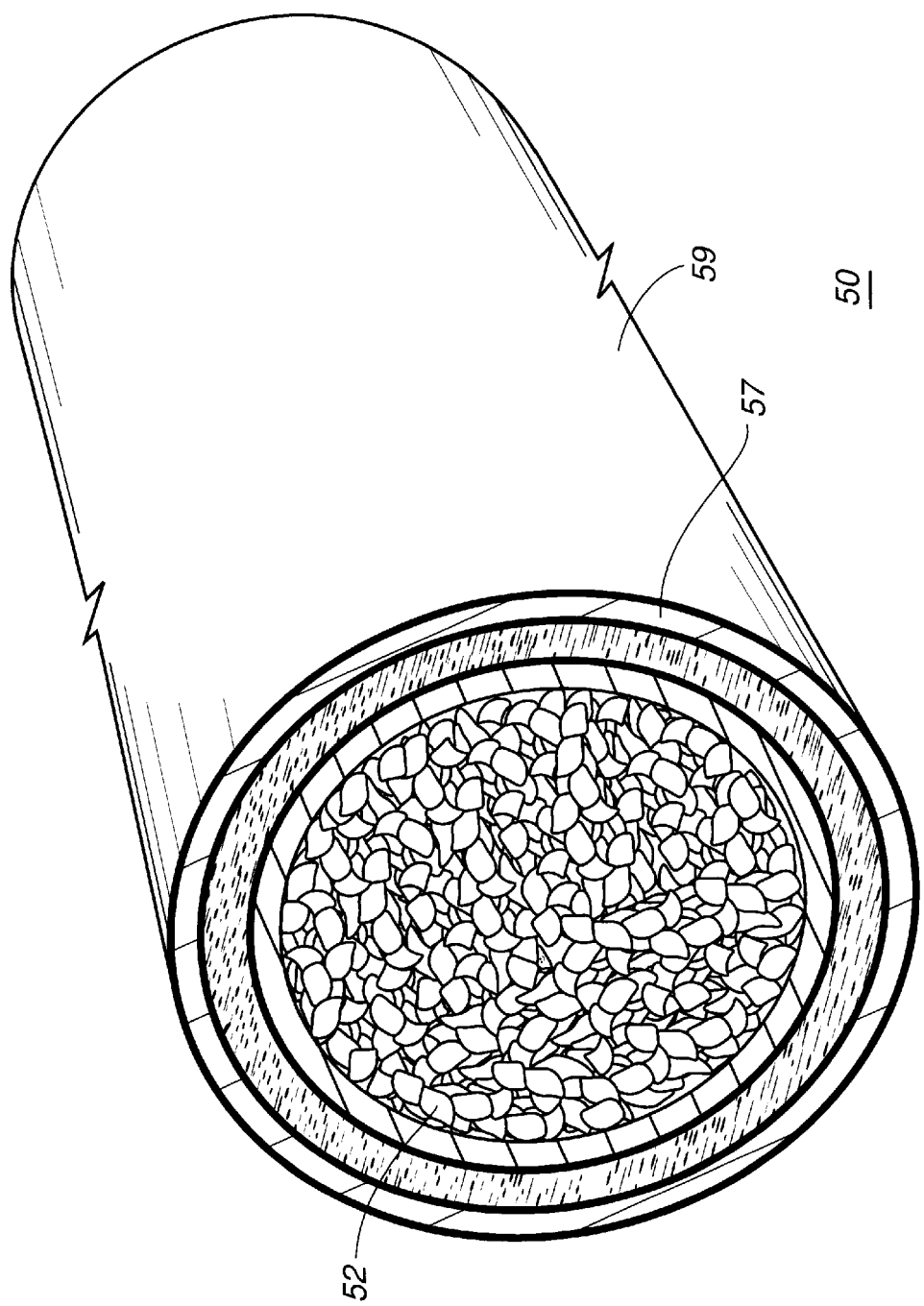

Another obvious variant on the structure of FIG. 2 is to transport fuel down the central core and eliminate the outer chamber, as shown in FIG. 5. This can be down when the fuel cell 50 is used in terrestrial applications and is open to the environment. The fuel is dispensed to the reticulated vitreous metal central core 52, and the oxidant is supplied to the cathode 57 by oxygen in the atmosphere surrounding the fuel cell. A current collector 59 aids in securing the assembly together.

Figure 6:
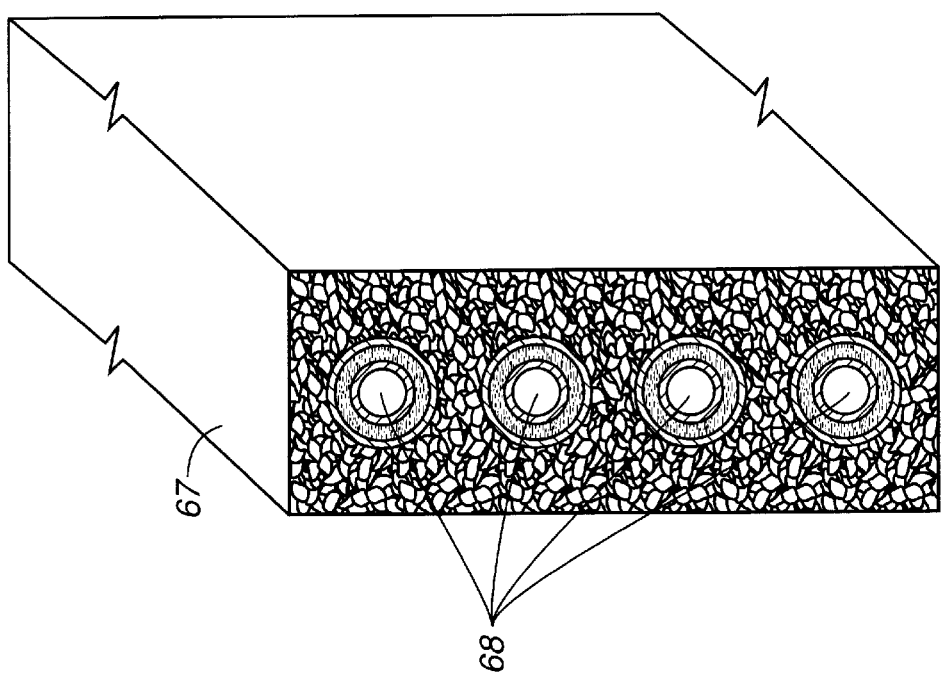

FIG. 6 illustrates how the structure of FIG. 3 can be ganged to create a fuel cell assembly having multiple cells. The reticulated vitreous metal 67 forms a block to house a plurality 68 of individual fuel cell cylinders. All the individual cells are fed air by the single porous block.

In the preferred embodiment, the high pressure fuel cell utilizes gaseous products, such as a hydrogen/air. As one skilled in the art will now appreciate, the preferred embodiment of our high pressure fuel cell has a construction that resembles a solid rod. As such, it lends itself well to automated fabrication so that a continuous length may be produced at much lower cost. This continuous elongated assembly can then be cut into sections of the desired length to create a novel fuel cell assembly.

In summary, we have provided a fuel cell that operates at pressures significantly higher than prior art cells, with higher efficiency and output, and at lower cost and less weight. While the preferred embodiments of the invention have been illustrated and described, it will be clear that the invention is not so limited, and other equivalents will occur to those skilled in the art without departing from the spirit and scope of the present invention. For example, though a single cylindrical fuel cell has been disclosed and shown in the drawings, it is apparent that multiple tubes can be connected using appropriate manifolding systems. These multiple tubes can be connected in series or parallel. Additional inlet channels for fuel and oxidants can also be provided along the length of the cell, along with suitable outlets. These and other variants are believed to be covered by the appended claims.

What is claimed is:

1. A coaxial fuel cell generally formed in the shape of a solid cylinder, comprising:
    a porous central core having an inside volume and a peripheral surface, the inside volume substantially filled with a foam material, to distribute fuel or oxidant through the fuel cell;
    a first electrode situated coaxially around and in intimate contact with the peripheral surface of the porous central core;
    a gas impermeable, ion-permeable solid polymer electrolyte situated coaxially around and in intimate contact with the first electrode; and
    a second electrode situated coaxially around and in intimate contact with the electrolyte.

2. The coaxial fuel cell as described in claim 1, further comprising a hollow chamber situated coaxially around and in intimate contact with the second electrode and arranged to allow fuel or oxidant to pass through it.

3. The coaxial fuel cell as described in claim 2, wherein fuel passes through the porous central core, oxidant passes through the hollow chamber, the first electrode is an anode, and the second electrode is a cathode.

4. The coaxial fuel cell as described in claim 3, further comprising a first noble metal catalyst disposed between the cathode and the electrolyte and a second noble metal catalyst disposed between the electrolyte and the anode.

5. The coaxial fuel cell as described in claim 2, wherein oxidant passes through the porous central core, fuel passes through the hollow chamber, the first electrode is a cathode, and the second electrode is an anode.

6. The coaxial fuel cell of claim 2, further comprising pressurized air in the porous central core and pressurized hydrogen gas in the hollow chamber.

7. The coaxial fuel cell of claim 2, further comprising a pressurized oxidant in the porous central core and a liquid fuel in the hollow chamber.

8. The coaxial fuel cell as described in claim 2, wherein hollow chamber is filled with reticulated vitreous metal.

9. The coaxial fuel cell as described in claim 1, wherein the porous central core is reticulated vitreous metal or reticulated vitreous carbon.

10. The coaxial fuel cell as described in claim 1, wherein the solid polymer electrolyte is polybenzimidazole, or perfluorinated sulfonic acids derived from fluorinated styrene.

11. The coaxial fuel cell of claim 1, wherein the porous central core functions as a current collector.

12. A coaxial fuel cell generally formed in the shape of a solid cylinder, comprising:
    a hollow central core to distribute fuel or oxidant through the fuel cell;
    a first electrode situated coaxially around and in intimate contact with the hollow central core;
    a gas impermeable, ion-permeable solid polymer electrolyte situated coaxially around and in intimate contact with the first electrode; and
    a second electrode situated coaxially around and in intimate contact with the electrolyte; and
    a reticulated vitreous metal situated coaxially around and in intimate contact with the second electrode and arranged to allow fuel or oxidant to pass through it.

13. The coaxial fuel cell as described in claim 12, wherein fuel passes through the hollow central core, the first electrode is an anode, and the second electrode is a cathode.

14. The coaxial fuel cell as described in claim 13, further comprising a first noble metal catalyst disposed between the cathode and the electrolyte and a second noble metal catalyst disposed between the electrolyte and the anode.

15. The coaxial fuel cell as described in claim 13, wherein the oxidant is air and the fuel is hydrogen.

16. The fuel cell of claim 13, wherein the hollow central core is filled with a liquid fuel and the porous outer layer passes oxygen under a pressure above ambient to the fuel cell.

17. The coaxial fuel cell as described in claim 12, wherein oxidant passes through the hollow central core, fuel passes through the porous outer layer, the first electrode is a cathode, and the second electrode is an anode.

18. The coaxial fuel cell as described in claim 12, wherein the porous outer layer is reticulated vitreous metal or reticulated vitreous carbon.

19. The coaxial fuel cell as described in claim 12, wherein the solid polymer electrolyte is polybenzimidazole, or perfluorinated sulfonic acids derived from fluorinated styrene.

20. The fuel cell of claim 12, further comprising pressurized hydrogen gas in the porous outer layer and pressurized air in the hollow central core.

21. The fuel cell of claim 12, wherein the porous outer layer functions as a current collector.

22. A coaxial fuel cell generally formed in the shape of a solid cylinder, comprising:
    a central core of reticulated vitreous aluminum or reticulated vitreous carbon to distribute an oxidant gas through the fuel cell at a pressure substantially above ambient;

a cathode situated coaxially around and in intimate contact with the central core;

a solid polymer electrolyte selected from the group consisting of polybenzimidazole, and perfluorinated sulfonic acids derived from fluorinated styrene, situated coaxially around and in intimate contact with the cathode;

a first noble metal catalyst disposed between the cathode and the electrolyte;

an anode situated coaxially around and in intimate contact with the electrolyte;

a second noble metal catalyst disposed between the electrolyte and the anode; and a fuel chamber situated coaxially around and in intimate contact with the anode and arranged to distribute a fuel gas through the fuel cell at a pressure substantially above ambient.

23. The fuel cell of claim 22, further comprising pressurized hydrogen gas in the fuel chamber and pressurized air in the central core.

* * * * *